United States Patent
Kim et al.

(10) Patent No.: US 10,997,402 B2
(45) Date of Patent: May 4, 2021

(54) SYSTEMS AND METHODS FOR REAL-TIME END-TO-END CAPTURING OF INK STROKES FROM VIDEO

(71) Applicant: FUJI XEROX CO., LTD., Tokyo (JP)

(72) Inventors: Chelhwon Kim, Palo Alto, CA (US); Patrick Chiu, Mountain View, CA (US); Hideto Oda, Cupertino, CA (US)

(73) Assignee: FUJI XEROX CO., LTD., Tokyo (JP)

(*) Notice: Subject to any disclaimer, the term of this patent is extended or adjusted under 35 U.S.C. 154(b) by 247 days.

(21) Appl. No.: 16/026,067

(22) Filed: Jul. 3, 2018

(65) Prior Publication Data

US 2020/0012850 A1    Jan. 9, 2020

(51) Int. Cl.
| | |
|---|---|
| *G06K 9/00* | (2006.01) |
| *G06K 9/62* | (2006.01) |
| *G06K 9/46* | (2006.01) |
| *G06N 5/04* | (2006.01) |
| *G06K 9/22* | (2006.01) |

(52) U.S. Cl.
CPC ......... *G06K 9/00402* (2013.01); *G06K 9/222* (2013.01); *G06N 5/046* (2013.01); *G06K 2209/01* (2013.01)

(58) Field of Classification Search
USPC .................. 382/187, 119, 158, 190
See application file for complete search history.

(56) References Cited

U.S. PATENT DOCUMENTS

| | | | | |
|---|---|---|---|---|
| 3,868,636 A | * | 2/1975 | Schlang | G06K 9/20 382/193 |
| 5,812,698 A | * | 9/1998 | Platt | G06K 9/00879 382/186 |
| 6,044,165 A | * | 3/2000 | Perona | G06K 9/222 345/179 |
| 7,570,813 B2 | | 8/2009 | Wang et al. | |
| 8,625,900 B2 | * | 1/2014 | Shieh | G06K 9/00154 382/187 |
| 10,262,235 B1 | * | 4/2019 | Chen | G06K 9/00422 |
| 10,438,080 B2 | * | 10/2019 | Shan | G06F 3/011 |
| 2007/0230791 A1 | * | 10/2007 | Chellapilla | G06K 9/00422 382/188 |

(Continued)

OTHER PUBLICATIONS

Badrinarayanan et al, SegNEt: A Deep convolutional encoder-decoder architecture for image segmentation, Dec. 2017, IEEE Transactions on patter analysis and machine intelligence, vol. 39, No. 12, 2481-2495 (Year: 2017).*

(Continued)

*Primary Examiner* — Kathleen Y Dulaney
(74) *Attorney, Agent, or Firm* — Procopio, Cory, Hargreaves & Savitch LLP

(57) ABSTRACT

A real-time end-to-end system for capturing ink strokes written with ordinary pen and paper using a commodity video camera is described. Compare to traditional camera-based approaches, which typically separate out the pen tip localization and pen up/down motion detection, described is a unified approach that integrates these two steps using a deep neural network. Furthermore, the described system does not require manual initialization to locate the pen tip. A preliminary evaluation demonstrates the effectiveness of the described system on handwriting recognition for English and Japanese phrases.

18 Claims, 4 Drawing Sheets

(56) References Cited

U.S. PATENT DOCUMENTS

| | | | | |
|---|---|---|---|---|
| 2007/0258243 | A1* | 11/2007 | Segall | H05B 47/10 362/276 |
| 2008/0292190 | A1* | 11/2008 | Biswas | G06K 9/00402 382/187 |
| 2010/0283766 | A1* | 11/2010 | Shieh | G06K 9/00154 345/179 |
| 2011/0113366 | A1* | 5/2011 | Cheong | G06F 3/04883 715/806 |
| 2015/0086114 | A1* | 3/2015 | Todeschini | G06K 9/00 382/189 |
| 2016/0073257 | A1* | 3/2016 | Duncan | G06F 3/04883 726/7 |
| 2017/0068868 | A1* | 3/2017 | Carbune | G06K 9/222 |
| 2018/0005082 | A1* | 1/2018 | Bluche | G06K 9/00409 |
| 2018/0191354 | A1* | 7/2018 | Haraden | G06F 15/82 |
| 2019/0279035 | A1* | 9/2019 | Bluche | G06K 9/4628 |
| 2019/0354818 | A1* | 11/2019 | Reisswig | G06K 9/00456 |

OTHER PUBLICATIONS

Anoto Livescribe Pen. https://www.livescribe.com.

Fuji Xerox Denshi-Pen. https://www.fujixerox.co.jp/product/stationery/denshi-pen.

Moleskin Smart Writing Set. http://www.moleskine.com/us/collections/model/smart-writing-set.

MyScript handwriting recognition engine (v7.2.1). http://www.myscript.com.

Wacom Technology Corporation. http://www.wacom.com.

Horst Bunke, T Von Siebenthal, T Yamasaki, and Markus Schenkel. Online handwriting data acquisition using a video camera. In Proc. ICDAR 1999, pp. 573-576.

Amay Champaneria and Larry Rudolph. Padcam: a human-centric perceptual interface for temporal recovery of pen-based input. In Proceedings of 2004 AAAI Symposium on Making Pen-Based Interaction Intelligent and Natural, AAAI Press, Arlington, Virginia, pp. 35-41, 2004.

Sanjiv Kumar Singh Dalbi et al. Review of online & offline character-recognition. International Journal Of Engineering And Computer Science, 4(05), 2015.

Gernot A Fink, Markus Wienecke, and Gerhard Sagerer. Video-based on-line handwriting recognition. In Proc. ICDAR 2001, pp. 226-230.

Sepp Hochreiter and Jürgen Schmidhuber. Long short-term memory. Neural computation, 9(8):1735-1780, 1997.

Pradeep Kumar Jayaraman and Chi-Wing Fu. Interactive line drawing recognition and vec-torization with commodity camera. In Proceedings of the 22nd ACM international conference on Multimedia, pp. 447-456. ACM, 2014.

Chelhwon Kim, Patrick Chiu, and Hideto Oda. Capturing handwritten ink strokes with a fast video camera. In 2017 14th IAPR International Conference on Document Analysis and Recognition (ICDAR), pp. 1269-1274. IEEE, 2017.

Jinho Lee, Brian Kenji Iwana, Shouta Ide, and Seiichi Uchida. Globally optimal object tracking with fully convolutional networks. arXiv preprint arXiv:1612.08274, 2016.

Feng Lin and Xiaoou Tang. Dynamic stroke information analysis for video-based handwritten chinese character recognition. In Computer Vision, 2003. Proceedings. Ninth IEEE International Conference on, pp. 695-700. IEEE, 2003.

Jonathan Long, Evan Shelhamer, and Trevor Darrell. Fully convolutional networks for seman-tic segmentation. In Proceedings of the IEEE conference on computer vision and pattern recognition, pp. 3431-3440, 2015.

Mario E Munich and Pietro Perona. Visual input for pen-based computers. In Proc. ICPR 1996, pp. 33-37.

Mario E. Munich and Pietro Perona. Visual input for pen-based computers. TPAMI, 24(3):313-328, 2002.

Viorica Patraucean, Ankur Handa, and Roberto Cipolla. Spatio-temporal video autoencoder with differentiable memory. arXiv preprint arXiv:1511.06309, 2015.

Re'jean Plamondon and Sargur N Srihari. Online and off-line handwriting recognition: a comprehensive survey. IEEE Transactions on pattern analysis and machine intelligence, 22(1):63-84, 2000.

Matthias Schroder and Helge Ritter. Hand-object interaction detection with fully convolu-tional networks. In The IEEE Conference on Computer Vision and Pattern Recognition (CVPR) Workshops, 2017.

Jae-Hyun Seok, Simon Levasseur, Kee-Eung Kim, and J Kim. Tracing handwriting on paper document under video camera. In ICFHR 2008.

Karen Simonyan and Andrew Zisserman. Very deep convolutional networks for large-scale image recognition. arXiv preprint arXiv:1409.1556, 2014.

Yilin Song, Chenge Li, and Yao Wang. Pixel-wise object tracking. arXiv preprint arXiv:1711.07377, 2017.

Sepehr Valipour, Mennatullah Siam, Martin Jagersand, and Nilanjan Ray. Recurrent fully convolutional networks for video segmentation. In Applications of Computer Vision (WACV), 2017 IEEE Winter Conference on, pp. 29-36. IEEE, 2017.

Lijun Wang, Wanli Ouyang, Xiaogang Wang, and Huchuan Lu. Visual tracking with fully convolutional networks. In Proceedings of the IEEE International Conference on Computer Vision, pp. 3119-3127, 2015.

Shi Xingjian, Zhourong Chen, Hao Wang, Dit-Yan Yeung, Wai-Kin Wong, and Wang-chun Woo. Convolutional lstm network: A machine learning approach for precipitation nowcast-ing. In Advances in neural information processing systems, pp. 802-810, 2015.

Toshinori Yamasaki and Tetsuo Hattori. A new data tablet system for handwriting characters and drawing based on the image processing. In Systems, Man, and Cybernetics, 1996., IEEE International Conference on, vol. 1, pp. 428-431. IEEE, 1996.

Wojciech Zaremba, Ilya Sutskever, and Oriol Vinyals. Recurrent neural network regulariza-tion. arXiv preprint arXiv:1409.2329, 2014.

\* cited by examiner

SYSTEMS AND METHODS FOR REAL-TIME END-TO-END CAPTURING OF INK STROKES FROM VIDEO

BACKGROUND OF THE INVENTION

Technical Field

The disclosed embodiments relate in general to systems and methods for data entry and, more specifically, to systems and methods for real-time end-to-end capturing of ink strokes from video.

Description of the Related Art

Data entry with a pen and paper can form a natural and convenient interface between a computer and a user. While the keyboard is the main input device to a computer, people still tend to prefer handwritten input over the keyboard in many tasks, such as note taking, brainstorming in a meeting, and hand sketch-based modeling. While there exist commercial products that can record ink strokes, they require special pen and/or paper with printed patterns, as described, for example in U.S. Pat. No. 7,570,813. Examples of such commercial products include: FX Denshi Pen Fuji Xerox Denshi-Pen, Anoto Livescribe Pen, Wacom Bamboo Spark, and the recently introduced Moleskin Smart Writing Set. These can be useful for vertical applications such as filling out forms, but for general usage it would be advantageous to be able to use ordinary pen and paper.

Camera-based approaches have been proposed over the years, as described, for example in Gernot A Fink, Markus Wienecke, and Gerhard Sagerer. Video-based on-line handwriting recognition. In Proc. ICDAR 2001, pages 226-230, Jae-Hyun Seok, Simon Levasseur, Kee-Eung Kim, and J Kim. Tracing handwriting on paper document under video camera. In ICFHR 200, Horst Bunke, T Von Siebenthal, T Yamasaki, and Markus Schenkel. Online handwriting data acquisition using a video camera. In Proc. ICDAR 1999, pages 573-576, Mario E Munich and Pietro Perona. Visual input for pen-based computers. In Proc. ICPR 1996, pages 33-37, Mario E. Munichand Pietro Perona. Visualinputfor-pen-basedcomputers.TPAMI,24(3):313-328, 2002, Chelhwon Kim, Patrick Chiu, and Hideto Oda. Capturing handwritten ink strokes with a fast video camera. In 2017 14th IAPR International Conference on Document Analysis and Recognition (ICDAR), pages 1269-1274. IEEE, 2017, Toshinori Yamasaki and Tetsuo Hattori. A new data tablet system for handwriting characters and drawing based on the image processing. In Systems, Man, and Cybernetics, 1996, IEEE International Conference on, volume 1, pages 428-431. IEEE, 1996, Pradeep Kumar Jayaraman and Chi-Wing Fu. Interactive line drawing recognition and vectorization with commodity camera. In Proceedings of the 22nd ACM international conference on Multimedia, pages 447-456. ACM, 2014, Feng Lin and Xiaoou Tang. Dynamic stroke information analysis for video-based handwritten Chinese character recognition. In Computer Vision, 2003. Proceedings. Ninth IEEE International Conference on, pages 695-700. IEEE, 2003 and Amay Champaneria and Larry Rudolph. Padcam: a human-centric perceptual interface for temporal recovery of pen-based input. In Proceedings of 2004 AAAI Symposium on Making Pen-Based Interaction Intelligent and Natural, AAAI Press, Arlington, Va., pages 35-41,2004. Most of these approaches typically rely on a two-stage pipeline: pen-tip tracking and pen-up/down detection. In the first stage, an initial location of the pen tip is manually determined, and the pen tip is tracked during the whole writing process using a combination of template matching and motion prediction model (e.g. Kalman filter). In the second stage, the pen-up and down events are detected by checking whether each tracked position of the pen tip resulted in an ink trace.

However, as the ink trace can be covered by the pen-tip or the hand of the user during the writing process, the last image of the video sequence with a complete ink trace often needs to be acquired after the video sequence reaches its end (or after a few frames delay). Hence, most of the existing camera-based approaches still fall short of real-time performance and not applicable to applications where recognition needs to be performed at the time of writing.

SUMMARY OF THE INVENTION

The embodiments described herein are directed to systems and methods that substantially obviate one or more of the above and other problems associated with the conventional systems and methods for handwritten ink stroke acquisition.

In accordance with one aspect of the embodiments described herein, there is provided a system comprising: at least one camera for acquiring a video of a handwriting of a user; and a processing unit for processing the captured video of the handwriting of the user using a neural network to detect a plurality of ink strokes and for recognizing the handwriting of the user using the detected plurality of ink strokes.

In one or more embodiments, the neural network is a deep learning neural network.

In one or more embodiments, the camera is a webcam.

In one or more embodiments, the camera is mounted above a tabletop.

In one or more embodiments, the camera is mounted on a desk lamp.

In one or more embodiments, the neural network comprises an encoder and a decoder.

In one or more embodiments, the encoder inputs a sequence of video frames of the captured video of the handwriting of the user and generates feature representations learned from convolutional network blocks.

In one or more embodiments, the encoder uses a recurrent neural network to generate the feature representations.

In one or more embodiments, the decoder converts the feature representations into pixel-wise label maps using deconvolutional network blocks.

In one or more embodiments, the convolutional network blocks are linked with the deconvolutional network blocks using a plurality of links.

In one or more embodiments, the handwriting of the user is recognized using a handwriting recognition engine.

In one or more embodiments, textual information based on the recognized handwriting of the user is being output.

In one or more embodiments, the handwriting of the user comprises ink written with ordinary pen and paper.

In accordance with another aspect of the embodiments described herein, there is provided a method comprising: using at least one camera to acquire a video of a handwriting of a user; and using a processing unit for process the captured video of the handwriting of the user using a neural network to detect a plurality of ink strokes and to recognize the handwriting of the user using the detected plurality of ink strokes.

In one or more embodiments, the neural network is a deep learning neural network.

In one or more embodiments, the camera is a webcam.

In one or more embodiments, the camera is mounted above a tabletop.

In one or more embodiments, the camera is mounted on a desk lamp.

In one or more embodiments, the neural network comprises an encoder and a decoder.

In one or more embodiments, the encoder inputs a sequence of video frames of the captured video of the handwriting of the user and generates feature representations learned from convolutional network blocks.

In one or more embodiments, the encoder uses a recurrent neural network to generate the feature representations.

In one or more embodiments, the decoder converts the feature representations into pixel-wise label maps using deconvolutional network blocks.

In one or more embodiments, the convolutional network blocks are linked with the deconvolutional network blocks using a plurality of links.

In one or more embodiments, the handwriting of the user is recognized using a handwriting recognition engine.

In one or more embodiments, textual information based on the recognized handwriting of the user is being output.

In one or more embodiments, the handwriting of the user comprises ink written with ordinary pen and paper.

In accordance with another aspect of the embodiments described herein, there is provided a tangible computer-readable medium embodying a set of instructions implementing a method comprising: using at least one camera to acquire a video of a handwriting of a user; and using a processing unit for process the captured video of the handwriting of the user using a neural network to detect a plurality of ink strokes and to recognize the handwriting of the user using the detected plurality of ink strokes.

In one or more embodiments, the neural network is a deep learning neural network.

In one or more embodiments, the camera is a webcam.

In one or more embodiments, the camera is mounted above a tabletop.

In one or more embodiments, the camera is mounted on a desk lamp.

In one or more embodiments, the neural network comprises an encoder and a decoder.

In one or more embodiments, the encoder inputs a sequence of video frames of the captured video of the handwriting of the user and generates feature representations learned from convolutional network blocks.

In one or more embodiments, the encoder uses a recurrent neural network to generate the feature representations.

In one or more embodiments, the decoder converts the feature representations into pixel-wise label maps using deconvolutional network blocks.

In one or more embodiments, the convolutional network blocks are linked with the deconvolutional network blocks using a plurality of links.

In one or more embodiments, the handwriting of the user is recognized using a handwriting recognition engine.

In one or more embodiments, textual information based on the recognized handwriting of the user is being output.

In one or more embodiments, the handwriting of the user comprises ink written with ordinary pen and paper.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided camera-based handwritten ink stroke acquisition systems and methods with ordinary pen and paper at sufficiently high quality for online handwriting recognition. "Online" means having the temporal ink stroke data, as opposed to "offline" where only a static image of the handwriting is used. It is generally accepted that online handwriting recognition performs better than offline, see, for example, Re jean Plamondon and Sargur N. Srihari. Online and off-line handwriting recognition: a comprehensive survey. IEEE Transactions on pattern analysis and machine intelligence, 22(1): 63-84, 2000 and Sanjiv Kumar, Singh Dalbiretal. Review of online & offline character recognition. International Journal Of Engineering And Computer Science, 4(05), 2015. This is especially important for Japanese and other Asian languages in which the stroke order of a character matters. In an embodiment of the described system, the writing process is observed using a video camera, and the trace of the ink is reconstructed as a time-ordered sequence of strokes as they are being written on paper. This temporal stroke data is sent to an online-handwriting recognition engine and is converted to text data. With the recognized text data, this acquisition system is beneficial to a wide range of applications: indexing & search systems, language translation, and remote collaboration.

In one embodiment, the described system uses a unified approach that efficiently integrates the above-described two steps using a deep neural network that operates on a sequence of images in real-time, which is better to meet the requirements of practical applications. In one embodiment, the described system does not require the manual initialization step for the pen-tip tracking.

Figure 1:
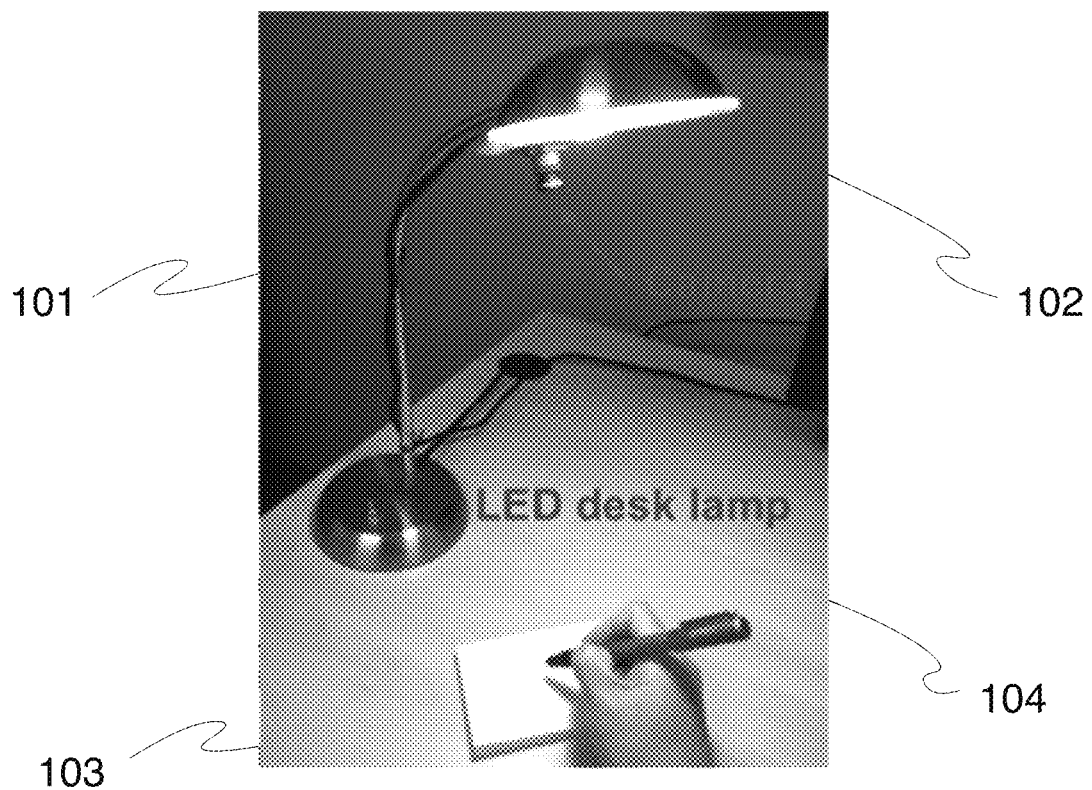
FIG. 1 shows a setup with a tiny camera attached under a LED desk lamp head that captures video frames of user's handwriting strokes.

An overview of the described system setup is shown in FIG. 1, which shows a setup with a tiny camera attached under a LED desk lamp head that captures video frames of user's handwriting strokes. Specifically, a tiny camera 101 attached under a LED desk lamp head 102 points at a paper 103 on the desk top 104 and captures the writing process of the user, including his or her ink strokes. In addition to a tabletop setting, other potentially useful scenarios are whiteboards and capturing handwriting with a camera on wearable devices including, without limitation, Google Glass and Google Clips.

Figure 2:
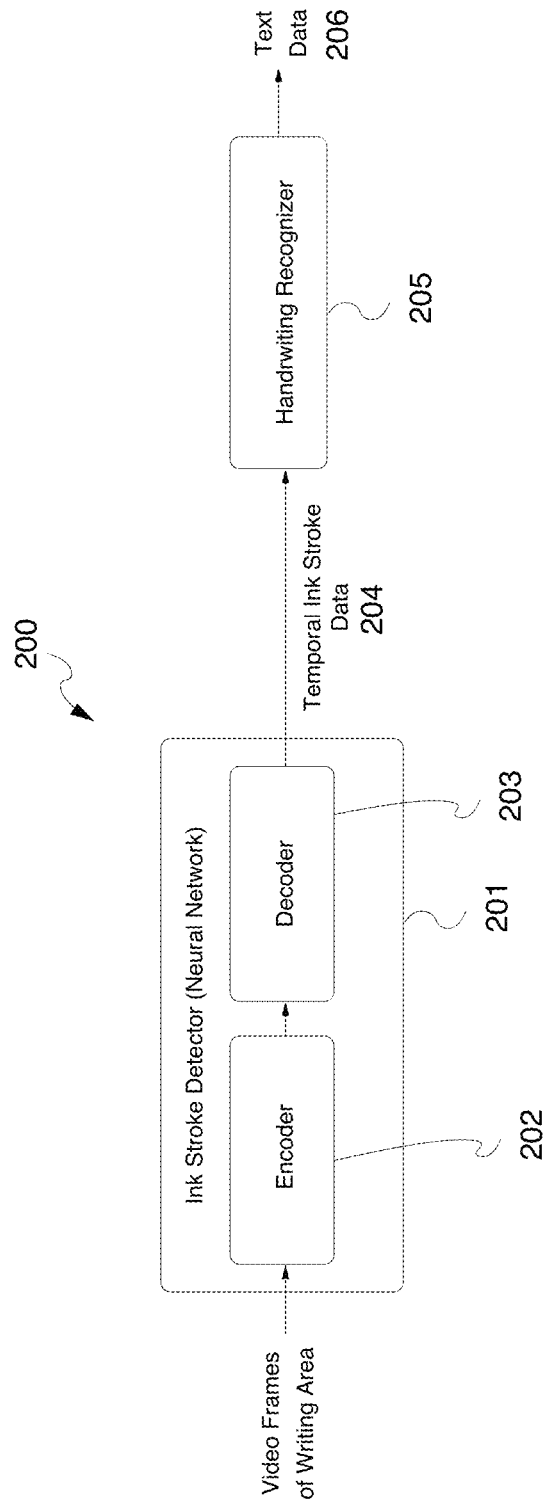
FIG. 2 illustrates an exemplary embodiment of a system flowchart 200 showing various exemplary modules of the described system.

FIG. 2 illustrates an exemplary embodiment of a system flowchart 200 showing various exemplary modules of the described system. Video frames of the writing process is sent to a deep neural network 201 which consists of an encoder 202 and a decoder 203. The network 201 reconstructs temporal ink stroke data 204 that is sent to a handwriting recognition engine 205 to convert it to text data 206. In one embodiment, the handwriting recognition engine 205 is based on MyScript software package well known in the art.

In the following section the system and technical details will be described. Let us define the state vector of the described system as $x=(x, y, v)^T$, where x, y are the coordinates of the pen-tip's location in the image and $v \in \{0, 1\}$ represents the pen tip's up/down motion. The goal is to estimate the current state at time t, $x_t=(x_t, y_t, v_t)^T$ given a sequence of video frames observed up to time t, i.e. to model $P(x_t|z_{1:t})$, where $z_{1:t}$ is the sequence of video frames observed up to the current time. From the sequence of state vectors generated from the described system, the temporal ink stroke data can be reconstructed by segmenting only pen-tip positions where its motion was down (i.e. $\{(x_t, y_t, 1)\}$).

Existing vision-based approaches typically separate out this problem as two sub-problems: estimation of $(x_t, y_t)$ by the pen-tip tracking, and the pen up/down classification for $v_t$. In this description, this problem is viewed as a pixel-level annotation task, i.e. each pixel in the image is assigned to one of three classes $\in$ {background, pen-up, pen-down}, and the task is to label a region of pixels on the pen-tip in the image either as pen-up, or as pen-down class based on the pen's motion, while other pixels are labeled as background class. With this annotated pixels, it is straightforward to reconstruct the ink stroke data by finding the pen-down pixels in the annotated image and computing their center of mass, which is the estimate of the pen-tip's location. Hence, by giving the pixel-wise label for consecutive frames, the pen-tip tracking and the pen-up/down classification is done simultaneously.

Prior efforts in this space, including Yilin Song, Chenge Li, and Yao Wang. Pixel-wise object tracking. arXiv preprint arXiv:1711.07377, 2017, JinhoLee, Brian Kenji Iwana, Shouta Ide, and Seiichi Uchida. Globally optimal object tracking with fully convolutional networks. arXiv preprint arXiv:1612.08274, 2016, Lijun Wang, Wanli Ouyang, Xiaogang Wang, and Huchuan Lu. Visual tracking with fully convolutional networks. In Proceedings of the IEEE International Conference on Computer Vision, pages 3119-3127, 2015, Sepehr Valipour, Mennatullah Siam, Martin Jagersand, and Nilanjan Ray. Recurrent fully convolutional networks for video segmentation. In Applications of Computer Vision (WACV), 2017 IEEE Winter Conference on, pages 29-36. IEEE, 2017 and Matthias Schroeder and Helge Ritter. Hand-object interaction detection with fully convolutional networks. In The IEEE Conference on Computer Vision and Pattern Recognition (CVPR) Workshops, 2017, primarily concerned only the detection part that classifies pixels as foreground/background. In the described case, model is built that not only separates the target from the background, but also detects the target's dynamic changes between its multiple states (i.e. between pen-up and pen-down state) throughout the sequence of video frames.

Now the goal, in this pixel-wise annotation task, is to model $P(v_t(x, y)|z_{1:t})$, where $v_t(x, y) \in$ {background, pen-up, pen-down} is the assigned label to a pixel at (x, y) location, and convolutional neural networks and recurrent neural networks are leveraged to effectively model $P(v_t(x, y)|z_{1:t})$. The deep neural network's architecture will be described in detail in the next section.

Network Architecture

Figure 3:
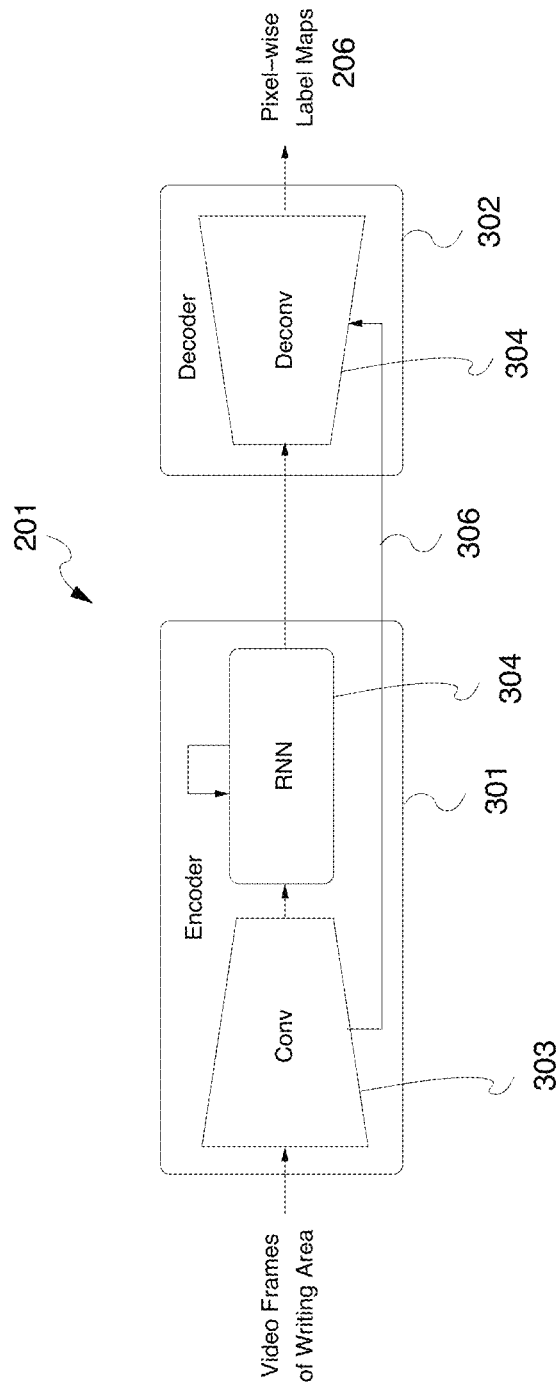
FIG. 3 illustrates an exemplary embodiment of an ink stroke detector network.

In one or more embodiments, a deep learning neural network to model $P(v_t(x,y)|z_{1:t})$ is used. FIG. 3 illustrates an exemplary embodiment of an ink stroke detector network 201. The shown embodiment of the network 201 consists of an encoder 301 and a decoder 302. The encoder 301 takes a sequence of video frames as an input and outputs feature representations learned from convolutional networks, which is performed by a convolution module 303 in FIG. 3. In order to learn temporal dynamics of the pen-tip's motion & appearance that help the system detect the pen-up/down events, the feature maps from the convolution module go further to recurrent neural networks, see the RNN module 304 in FIG. 3. Note that this architecture does not need to reference the last image taken which has the complete ink trace.

In one or more embodiments, the convolutional network module 303, follows the structure of VGG-16 network described in Karen Simonyan and Andrew Zisserman. Very deep convolutional networks for large-scale image recognition. arXiv preprint arXiv:1409.1556, 2014, which was developed for large scale image classification, except that the fully-connected layers are converted to convolutional layers as described in Jonathan Long, Evan Shelhamer, and Trevor Darrell. Fully convolutional networks for semantic segmentation. In Proceedings of the IEEE conference on computer vision and pattern recognition, pages 3431-3440, 2015. In the recurrent neural network block, the convolutional LSTMs described in Viorica Patraucean, Ankur Handa, and Roberto Cipolla. Spatio-temporal video autoencoder with differentiable memory. arXiv preprint arXiv:1511.06309, 2015, SHI Xingjian, Zhourong Chen, Hao Wang, Dit-Yan Yeung, Wai-Kin Wong, and Wang-chun Woo. Convolutional lstm network: A machine learning approach for precipitation nowcasting. In Advances in neural information processing systems, pages 802-810, 2015 and Yilin Song, Chenge Li, and Yao Wang. Pixel-wise object tracking. arXiv preprint arXiv:1711.07377, 2017, are used to preserve spatial information rather than using fully-connected LSTMs described in Sepp Hochreiter and Jürgen Schmidhuber. Long short-term memory. Neural computation, 9(8):1735-1780, 1997 and Wojciech Zaremba, Ilya Sutskever, and Oriol Vinyals. Recurrent neural network regularization. arXiv preprint arXiv:1409.2329, 2014, that unfold the 2D feature maps from the convolutional network block to 1D vectors, as a result, all the spatial information will be lost, as described in SHI Xingjian, Zhourong Chen, Hao Wang, Dit-Yan Yeung, Wai-Kin Wong, and Wang-chun Woo. Convolutional lstm network: A machine learning approach for precipitation nowcast-ing. In Advances in neural information processing systems, pages 802-810, 2015.

In one or more embodiments, in the decoder part 302, the encoded feature maps go through deconvolutional layers to generate the pixel-wise label maps. Multiple links 306 between layers in the convolutional network block 303 and the deconvolutional network block 305 can be constructed as described in Jonathan Long, Evan Shelhamer, and Trevor Darrell. Fully convolutional networks for semantic segmentation. In Proceedings of the IEEE conference on computer vision and pattern recognition, pages 3431-3440, 2015, which is called skip connection to combine semantic information from a high-level, coarse layer with appearance information from a low-level, fine layer to produce accurate and detailed labeling maps.

Exemplary Embodiment of a Computer System

Figure 4:
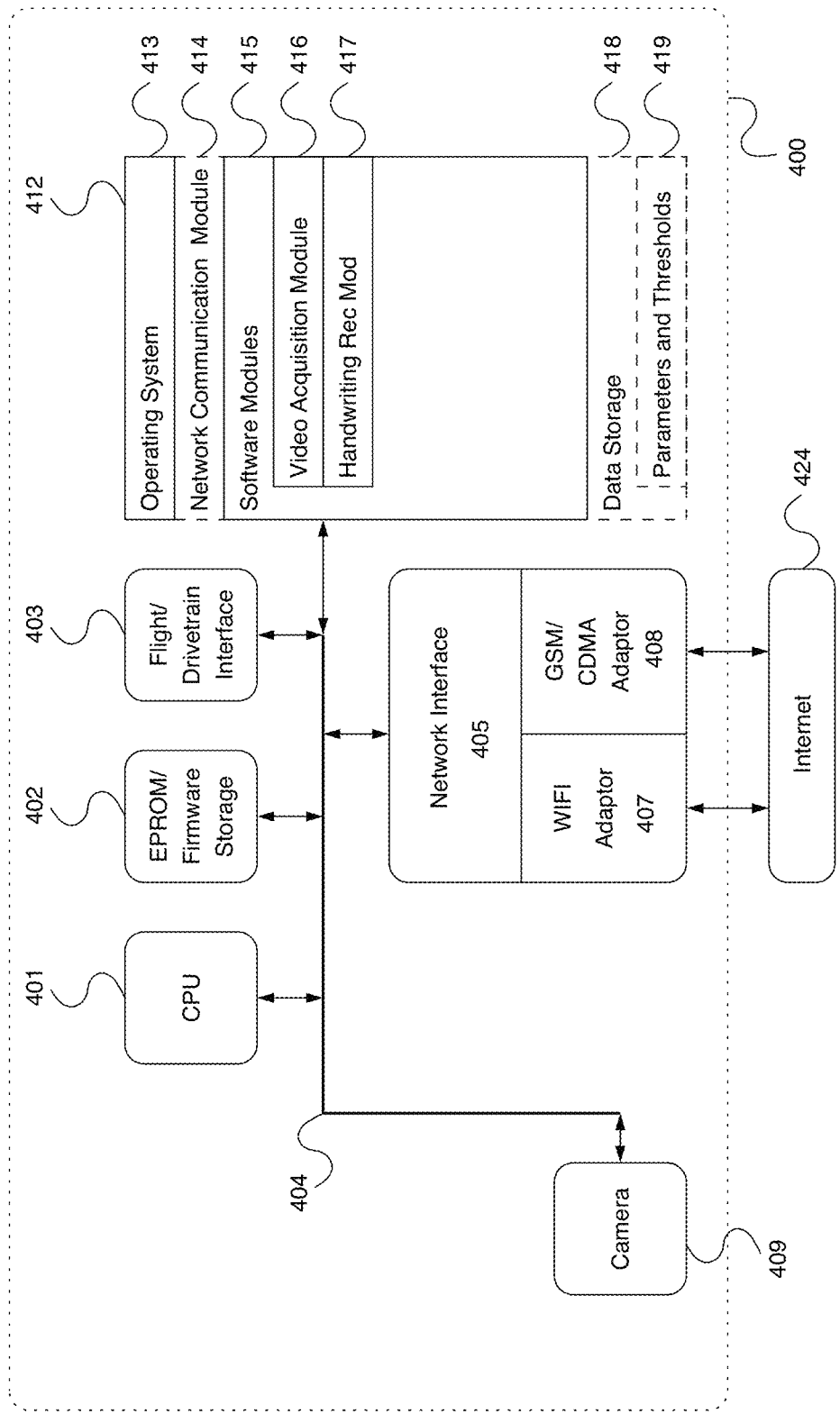
FIG. 4 illustrates an exemplary embodiment of a computer system 400, which may be used to implement the techniques described herein.

FIG. 4 illustrates an exemplary embodiment of a computer system 400, which may be used to implement the techniques described herein. In one or more embodiments, the computer 400 may be implemented within the form factor of a mobile computing device well known to persons of skill in the art. In an alternative embodiment, the computer 400 may be implemented based on a laptop or a notebook computer. Yet in an alternative embodiment, the computer 400 may be a specialized computing system.

The computer 400 may include a data bus 404 or other interconnect or communication mechanism for communicating information across and among various hardware components of the computer 400, and a central processing unit (CPU or simply processor) 401 coupled with the data bus 404 for processing information and performing other computational and control tasks. The computer 400 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computer 400 may further include a read only memory (ROM or EPROM) 402 or other static storage device coupled to the data bus 404 for storing static information and instructions for the processor 401, such as firmware necessary for the operation of the computer 400, basic input-output system (BIOS), as well as various configuration parameters of the computer 400.

In one or more embodiments, the computer 400 may additionally incorporate a camera 409 for capturing a video of user's ink strokes.

In one or more embodiments, the computer 400 may additionally include a communication interface, such as a network interface 405 coupled to the data bus 404. The network interface 405 may be configured to establish a connection between the computer 400 and the Internet 424 using at least one of WIFI interface 407 and the cellular network (GSM or CDMA) adaptor 408. The network interface 405 may be configured to provide a two-way data communication between the computer 400 and the Internet 424. The WIFI interface 407 may operate in compliance with 802.11a, 802.11b, 802.11g and/or 802.11n protocols as well as Bluetooth protocol well known to persons of ordinary skill in the art. In an exemplary implementation, the WIFI interface 407 and the cellular network (GSM or CDMA) adaptor 408 send and receive electrical or electromagnetic signals that carry digital data streams representing various types of information.

In one or more embodiments, the Internet 424 typically provides data communication through one or more sub-networks to other network resources. Thus, the computer 400 is capable of accessing a variety of network resources located anywhere on the Internet 424, such as remote media servers, web servers, other content servers as well as other network data storage resources. In one or more embodiments, the computer 400 is configured send and receive messages, media and other data, including application program code, through a variety of network(s) including Internet 424 by means of the network interface 405. In the Internet example, when the computer 400 acts as a network client, it may request code or data for an application program executing in the computer 400. Similarly, it may send various data or computer code to other network resources.

In one or more embodiments, the functionality described herein is implemented by the computer 400 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 401 for execution. For example, the instructions may initially be carried on a magnetic disk from a remote computer. Alternatively, a remote computer can load the instructions into its dynamic memory and send the instructions over the Internet 424. Specifically, the computer instructions may be downloaded into the memory 412 of the computer 400 from the foresaid remote computer via the Internet 424 using a variety of network data communication protocols well known in the art.

In one or more embodiments, the memory 412 of the computer 400 may store any of the following software programs, applications and/or modules:

1. Operating system (OS) 413, which may be a mobile operating system for implementing basic system services and managing various hardware components of the computer 400. Exemplary embodiments of the operating system 413 are well known to persons of skill in the art, and may include any now known or later developed mobile operating systems. Additionally provided may be a network communication module 414 for enabling network communications using the network interface 405.

2. Software modules 415 may include, for example, a set of software modules executed by the processor 401 of the computer 400, which cause the computer 400 to perform certain predetermined functions, such as capturing video of user's ink strokes (module 416) and performing high quality for online handwriting recognition (module 417).

3. Data storage 418 may be used, for example, for storing various parameters and thresholds 419.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for high quality online handwriting recognition. It is intended that the specification and examples be considered as exemplary only, with a true scope and spirit of the invention being indicated by the following claims.

What is claimed is:

1. A system comprising:
   at least one camera for acquiring a video of a handwriting of a user; and
   a processing unit for processing the acquired video of the handwriting of the user using a neural network to detect a plurality of ink strokes and for recognizing the handwriting of the user using the detected plurality of ink strokes,
   wherein the neural network comprises an encoder and a decoder,
   wherein the encoder inputs a sequence of video frames of the acquired video of the handwriting of the user and generates feature maps learned from convolutional network blocks,
   wherein the encoder uses a recurrent neural network to generate feature representations based on the feature maps learned from the convolutional network blocks,
   wherein the decoder receives the feature maps from the convolutional network blocks and converts the feature representations from the recurrent neural network into pixel-wise label maps using deconvolutional network blocks and the feature maps learned by the decoder from the convolutional network blocks, and
   wherein the convolutional network blocks are linked with the deconvolutional network blocks using a plurality of links.

2. The system of claim 1, wherein the neural network is a deep learning neural network.

3. The system of claim 1, wherein the camera is a webcam.

4. The system of claim 1, wherein the camera is mounted above a tabletop.

5. The system of claim 1, wherein the camera is mounted on a desk lamp.

6. The system of claim 1, wherein the handwriting of the user is recognized using a handwriting recognition engine.

7. The system of claim 1, wherein the processing and recognizing are performed in real-time.

8. The system of claim 1, wherein the processing unit outputs a textual information based on the recognized handwriting of the user.

9. The system of claim 1, wherein the handwriting of the user comprises ink written with ordinary pen and paper.

10. The system of claim 1, further comprising using the pixel-wise label maps for consecutive video frames of the acquired video to simultaneously track a pen-tip and classify the consecutive video frames as pen-up or pen-down, wherein the plurality of ink strokes is detected based on classifying the consecutive video frames as pen-up or pen-down.

11. A method comprising:
   using at least one camera to acquire a video of a handwriting of a user; and
   using a processing unit to process the acquired video of the handwriting of the user using a neural network to detect a plurality of ink strokes and for recognizing the handwriting of the user using the detected plurality of ink strokes,
   wherein the neural network comprises an encoder and a decoder,
   wherein the encoder inputs a sequence of video frames of the acquired video of the handwriting of the user and generates feature maps learned from convolutional network blocks,
   wherein the encoder uses a recurrent neural network to generate feature representations based on the feature maps learned from the convolutional network blocks,
   wherein the decoder receives the feature maps from the convolutional network blocks and converts the feature representations from the recurrent neural network into pixel-wise label maps using deconvolutional network blocks and the feature maps learned by the decoder from the convolutional network blocks, and
   wherein the convolutional network blocks are linked with the deconvolutional network blocks using a plurality of links.

12. The method of claim 11, wherein the neural network is a deep learning neural network.

13. The method of claim 11, wherein the camera is a webcam.

14. The method of claim 11, wherein the camera is mounted above a tabletop.

15. The method of claim 11, wherein the camera is mounted on a desk lamp.

16. The method of claim 11, further comprising using the processing unit to output a textual information based on the recognized handwriting of the user.

17. The method of claim 11, wherein the handwriting of the user comprises ink written with ordinary pen and paper.

18. A tangible computer-readable medium embodying a set of instructions implementing a method comprising:

using at least one camera to acquire a video of a handwriting of a user; and using a processing unit for process the acquired video of the handwriting of the user using a neural network to detect a plurality of ink strokes and for recognizing the handwriting of the user using the detected plurality of ink strokes, wherein the neural network comprises an encoder and a decoder, wherein the encoder inputs a sequence of video frames of the acquired video of the handwriting of the user and generates feature maps learned from convolutional network blocks, wherein the encoder uses a recurrent neural network to generate feature representations based on the feature maps learned from the convolutional network blocks, wherein the decoder receives the feature maps from the convolutional network blocks and converts the feature representations from the recurrent neural network into pixel-wise label maps using deconvolutional network blocks and the feature maps learned by the decoder from the convolutional network blocks, and wherein the convolutional network blocks are linked with the deconvolutional network blocks using a plurality of links.

\* \* \* \* \*